Figure 1:
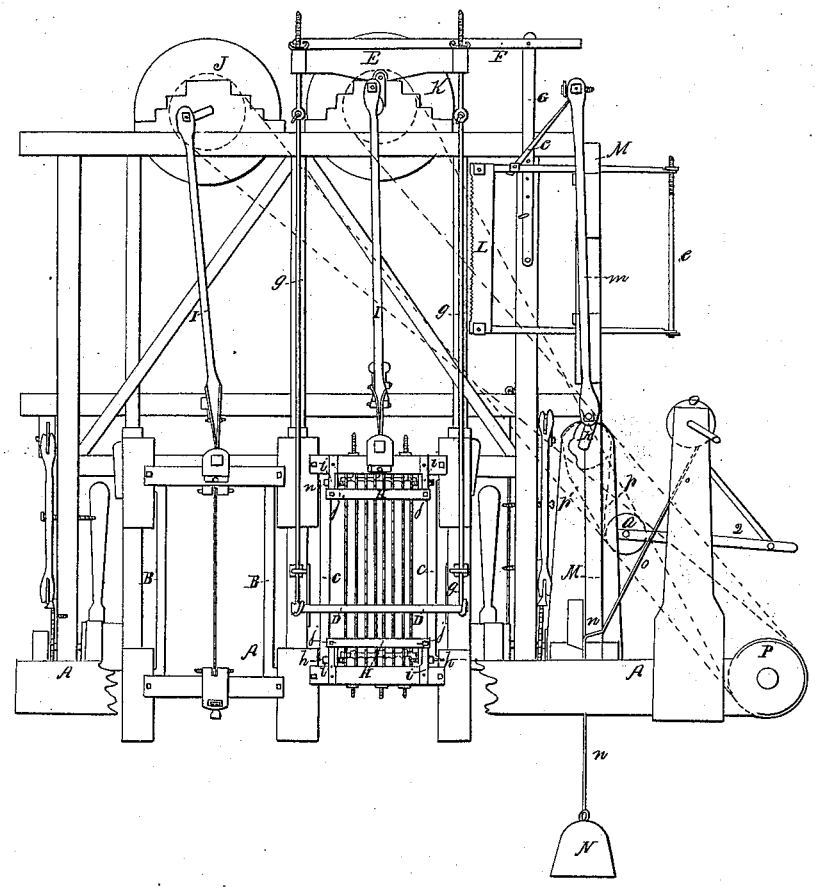

A. Wilbur,
Sawing Shingles,
Sheet 1-2 Sheets.

N°150,
Patented Mar. 25, 1837.

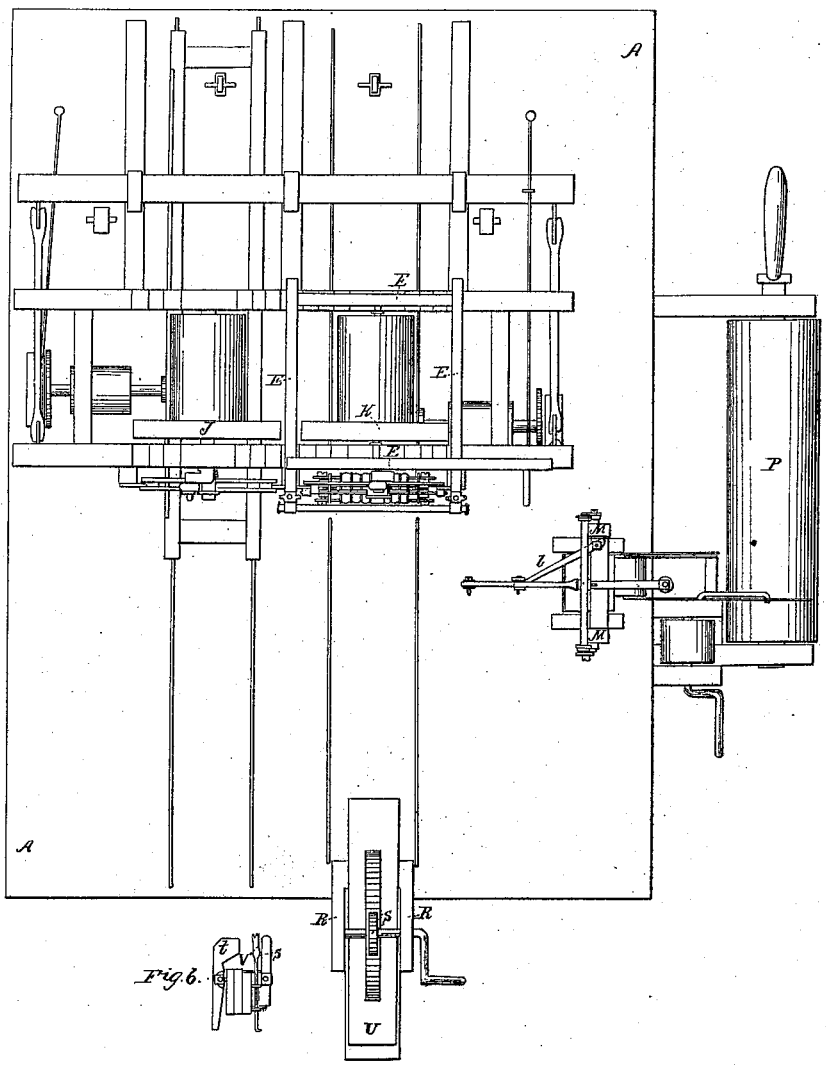

UNITED STATES PATENT OFFICE.

APOLLOS WILBUR, OF BURRILVILLE, RHODE ISLAND.

MACHINE FOR SAWING SHINGLES, CLAPBOARDS, LATHS, AND VARIOUS OTHER SPECIES OF LUMBER.

Specification of Letters Patent No. 150, dated March 25, 1837.

*To all whom it may concern:*

Be it known that I, APOLLOS WILBUR, of Burrilville, in the county of Providence, in the State of Rhode Island, have invented a new and improved sawing-machine, which I denominate "Wilbur's Sawing-Machine," and which is applicable to the sawing of laths, clapboards, shingles, and various other species of lumber, whether the same be required to be of equal thickness throughout, to vary in thickness either in length or in width, or to be cross-cut at different lengths; and I do hereby declare that the following is a full and exact description thereof, reference being had to the drawings which accompany and make a part of this specification.

For the purpose of manufacturing the different kinds of lumber by means of my machinery, I have combined together a single mill-saw, a gang of saws, and a cross-cut saw, or saws; the two former operating vertically, in the usual way, and the latter operating horizontally, or obliquely; and to these I have appended certain new apparatus, to be presently described, by which I have adapted them to the various purposes above indicated.

In the accompanying drawings, Figure 1 is an elevation of the machine in front of the saws, and Fig. 2, a top view of it; where the same parts are represented in both figures, they are designated by the same letters of reference. In the other figures, such individual parts are shown as could not be otherwise distinctly exhibited. The lines A, A, A, may represent the floor of the mill; B, the frame of the single saw, which is provided with a carriage constructed in the usual manner. It is used to prepare the logs, by removing the slabs, and otherwise reducing the stuff to such thickness as will adapt it to conversion into shingles, clapboards, laths, or other merchantable lumber. C, C, is the frame of the gang of saws, by means of which the prepared stuff is to be cut into the form finally intended; to enable it to effect this object, it is furnished with a double carriage, one of which is placed upon the other. The lower carriage does not differ in its general construction from the ordinary carriage of saw mills; but the second carriage, which stands upon it, is so constructed that it may be made to rock, or cant, over toward either side of the lower carriage, so that after the gang of saws have penetrated a log, or plank, to the required length for clapboards, or feather-edged stuff, the log, or plank, may be withdrawn, canted over, and again fed to the saws. The first cut must, of course, have the timber of sufficient thickness for two clapboards. There must, in this case, be a space of two, or three, inches between the carriages. When shingles are to be cut, the double carriage is used, but instead of the rocking motion requisite for feather-edged, or clapboards, the upper carriage lies directly on the lower, and is so fixed that it may move horizontally upon a pin at one end of it, by which motion it is adapted to form the heels and points of the shingles.

Fig. 3, is a top view of this double carriage, $a$, $a$, $a$, $a$ being parts of the lower, and $b$, $b$, $b$, of the upper carriage. When shingles are to be cut, a pin, $c$, passes through a cross rail of the upper and lower carriages, and at the opposite end, $d$, a similar pin is passed through in the same way, serving to keep the upper, either in the same direction with the lower carriage, or in the position given to it when canted laterally for forming the heads and points of the shingles; the stuff from which they are to be cut, being, as in the case of clapboards, sawed of a sufficient thickness for two.

Fig. 4, is an end view of the double carriage when used for clapboards. The upper carriage, $b$, is raised above the lower, $a$, and is capable of rocking upon it by means of a joint strap and pin, $e$, at each end, allowing the side timbers on either side to approach each other.

$f$, $f$, Fig. 3, are jointed pieces of timber which may be made to pass in between the upper and the lower carriage when necessary, to wedge them apart; this, however, may be effected in various ways.

There is a roller, D, D, immediately in front of the gang of saws, which roller supports the end of the timber, and revolves under it as it is fed up to the saws. This roller is supported upon slings, $g$, $g$, by means of which, and of a vibrating frame E, E, the roller may be placed, and kept, either in a horizontal, or an inclined position, adapted to the stuff which is being sawed. F, is a lever attached to the vibrating frame, and G, a strap, or rod, by which it may be moved in either direction, and affixed as required. To set the gang saws correctly, I use eight set screws, four of which are seen at h, h, h, h, bearing against the front edges of the outer saws, and behind them there are four others bearing in a similar manner on the back edges. These screws pass through pieces, i, i, i, i, firmly attached to the saw frame. By their means, it is manifest that the whole gang may be adjusted so as to set all the saws vertically with the frame, and in a straight line with the carriage.

H, H, are flat iron bars crossing the saw frame at the upper and lower ends of the saws, there being two similarly placed at the back. These bars are each regulated by two set screws j, j, and are thereby made to regulate the whole gang of saws in their feed, causing them to slope forward in any degree which may be required.

I, I, are the shackle bars, or pitmen, for working the saw frames B, and C, being actuated by cranks on the shafts of the drums J and K. The feeding is performed by feed hands, and rag-wheels, in the usual way.

L, is the cross cut saw, which is shown as standing in a vertical position, but is capable of being turned down upon the stuff which has been cut into clapboards, shingles, laths, &c., so as to cut them off to a proper length preparatory to advancing the log for a new series.

M, M, are the fender posts of the frame of this saw, their ends, only, being seen in Fig. 2. These fender posts swivel upon the crank shaft k, of the saw frame which works between the fender posts, and which has various braces l, l, l, l, to give it the requisite stability for the operation it is to perform. The shaft k, has a second crank at its opposite end, carrying on the opposite side a second shackle bar, or pitman, similar to that marked m. The fender posts and frame of this saw are, when the saw is not in use, kept in a vertical position by means of the weight N, the cord, n, from which is attached to its lower end.

O, is a windlass from which a rope o, o, descends, which is also attached to the lower end of the fender post, and by turning this windlass, the rope winds around it, and the saw L, is brought down upon the log. The saw frame is so constructed that the saw may be shifted sideways, so as to approach near to, or recede from, the gang of saws, and, if required, two saws may be placed parallel to each other.

P, is the main drum from which the power is communicated by belts to the three saw frames. A belt from this drum may also pass around a pulley below the floor of the mill, and have such shafts and gearing attached to it as to back the carriages, there being apparatus to throw them into and out of gear for that purpose. This may be effected in various ways well known to millrights, and forms no part of my claim to invention.

When shingles, clapboards, laths, or other articles, have been sawed by the gang saws, and are ready to be cut off, the cross cut saw is brought down in the manner above indicated, to that point upon the log where the cross-cutting is to be effected; a tightening pulley Q, is made to bear upon the belt p, p, by means of the the lever q; this belt at other times runs loosely around the drum on the crank shaft of the cross cut saw, but when thus tightened it vibrates the saw, and cross cuts the log, having its end perfectly square, and ready for a new operation.

To cause the stuff to advance upon the upper carriage, after the cross-cutting I employ a rack and pinion, and their appendages, as shown in Fig. 2. R, R, are two standards affixed to the floor of the mill, and receiving the shaft of the pinion S, which meshes into a rack T, fastened to a piece of timber U, which I call a follower; the inner end of this follower slides upon the carriage, and bears against the stuff, causing it to advance as may be required. There may be rollers crossing the upper carriage, to support the timber, and to aid it in moving forward. Instead of an ordinary dog, I usually hold the timber down by a weighted lever, or some analogous device.

Fig. 5, represents a head, or tail, block, and dogs of a peculiar construction. The head blocks which I use I make in three thicknesses of stuff, instead of cutting them from a solid block, as has heretofore been done. The lower piece which falls in between the sides of the carriage, has the grain crosswise of the carriage; the next, or middle piece, which rests upon the carriage, has the grain lengthwise of the carriage; and the upper, or third, thickness, its grain crosswise. By this means the block is readily made, with less labor and stuff, and is much stronger, than blocks made in the ordinary way; the pieces must, of course, be firmly bolted, or pinned, together. The dogs V, V, have their toothed ends r, r, tubular, from which mode of forming them they may be driven into the log without any danger of splitting it; they slide in eyes, or loops, like other bolt dogs, and are to be confined in place by wedges, in the usual manner.

Fig. 6, is a kind of tail block, with its appendages, which I sometimes use behind the gang of saws. Its peculiarity consists in its having upon it, in addition to the dogs V, V, an apparatus s, s, formed like a comb, of thin plates of iron, at such a distance apart that a plate, or tooth, may pass into each kerf, as the stuff passes through the gang saws. This comb is fixed upon a round bar, or joint rod, and can be turned up, shifted laterally and fixed in any proper position, by means of a wedge, or wedges. Its use is to prevent the shaking, or vibrating of the stuff as it is cut. On the lower part of this block, also, there are fitted iron plates, $t, t$, which pass in between the saws, and serve to support the lower side of the timber; performing the office of the bearing parts of an ordinary block, which is kerfed to admit the saws.

What I claim as my invention in the above described sawing machinery, and wish to secure by Letters Patent, is—

1. The employment of a double saw mill carriage, such as I have herein described, for the sawing of shingles, clapboards, and other lumber, varying in thickness; the two carriages being combined, or connected together, substantially in the manner set forth.

2. I also claim, in combination therewith, the manner of arranging and operating the cross cut saw, or saws, as described.

3. I also claim the modes described of giving the proper position and direction to the gang of saws, by the set screws acting upon the sides of the outer saws, as herein set forth; and also the flat iron bars, with their set screws, for setting the saws even on their edges, and giving them the proper inclination, or feed, in the particular manner set forth.

4. I claim, likewise, the particular manner herein described, of forming head and tail blocks in three, or more thicknesses; and the employment of bolt dogs with hollow, or tubular, ends.

5. I claim the using of a roller suspended in such a manner that either end may be lowered, or raised, for the purpose of sustaining the stuff in front of the gang of saws.

6. I also claim the comb pieces for entering the saw kerfs, to steady the lumber as it is cut.

APOLLOS WILBUR.

Witnesses:
    THOS. P. JONES,
    HENRY W. FISH.